(12) United States Patent
Le Roux

(10) Patent No.: US 12,671,606 B2
(45) Date of Patent: Jun. 30, 2026

(54) METHOD AND DEVICE FOR SELECTING A NODE IN A LOCAL AREA NETWORK

(71) Applicant: SAGEMCOM BROADBAND SAS, Rueil Malmaison (FR)

(72) Inventor: Sylvain Le Roux, Rueil Malmaison (FR)

(73) Assignee: SAGEMCOM BROADBAND SAS, Bois-Colombes (FR)

( * ) Notice: Subject to any disclaimer, the term of this patent is extended or adjusted under 35 U.S.C. 154(b) by 0 days.

(21) Appl. No.: 18/234,015

(22) Filed: Aug. 15, 2023

(65) Prior Publication Data

US 2024/0080222 A1     Mar. 7, 2024

(30) Foreign Application Priority Data

Sep. 1, 2022    (FR) ...................................... 2208773

(51) Int. Cl.
H04L 12/46 (2006.01)
H04W 84/18 (2009.01)
(52) U.S. Cl.
CPC ......... H04L 12/4616 (2013.01); H04W 84/18 (2013.01)
(58) Field of Classification Search
None
See application file for complete search history.

(56) References Cited

U.S. PATENT DOCUMENTS

| | | | | | |
|---|---|---|---|---|---|
| 9,820,658 | B2 * | 11/2017 | Tran | ...................... | A61B 5/7225 |
| 10,009,826 | B1 * | 6/2018 | Fang | ..................... | H04W 88/04 |

| | | | | | |
|---|---|---|---|---|---|
| 10,117,117 | B2 * | 10/2018 | Elliott | ................... | H04W 24/04 |
| 10,164,858 | B2 * | 12/2018 | Gunasekara | ........ | H04L 43/0817 |
| 10,278,179 | B2 * | 4/2019 | Amini | ................... | H04W 16/20 |
| 10,326,689 | B2 * | 6/2019 | Liu | ................... | H04W 28/0226 |
| 10,417,887 | B2 * | 9/2019 | Amini | ................. | H04B 17/345 |
| 10,448,436 | B2 * | 10/2019 | Mehta | ................... | H04W 92/20 |

(Continued)

FOREIGN PATENT DOCUMENTS

| | | |
|---|---|---|
| WO | 2021/086249 A1 | 5/2021 |
| WO | 2022/152816 A1 | 7/2022 |

OTHER PUBLICATIONS

Huawei; "Inter-CU migration procedure;" 3GPP TSG-RAN WG3 meeting #110-e E-meeting; 2020; pp. 1-5; retrieved from the Intenet; URL: https://ftp.3gpp.org/tsg_ran/WG3_lu/TS GR3_11O-e/Docs/R3-2O6665.zip R3-2O6665 Inter-CU migration procedure. doc.

(Continued)

*Primary Examiner* — Melvin H Pollack
(74) *Attorney, Agent, or Firm* — Williams Mullen; R. Brian Drozd

(57) ABSTRACT

A method and a device for reconfiguring a first interconnection of a first node with a second node of a backhaul subnetwork in a local area network including a plurality of nodes, the first and second nodes being interconnected by a radio connection in a first frequency band. A controller node: selects a third node of the local area network, the third node being different from the first and second nodes, establishes a second interconnection between the first and third nodes by a radio connection in a second frequency band different from the first frequency band, deletes the first interconnection when the second interconnection is established.

7 Claims, 8 Drawing Sheets

(56) References Cited

U.S. PATENT DOCUMENTS

| | | | | |
|---|---|---|---|---|
| 10,630,410 | B2 * | 4/2020 | Parkvall | H04L 65/1023 |
| 10,664,792 | B2 * | 5/2020 | Berger | G06Q 10/0833 |
| 10,665,942 | B2 * | 5/2020 | Henry | H01Q 3/34 |
| 10,666,323 | B1 * | 5/2020 | Vannucci | H04L 45/22 |
| 10,687,228 | B2 * | 6/2020 | Gardner | H04W 24/02 |
| 10,797,781 | B2 * | 10/2020 | Bennett | H04L 5/14 |
| 10,812,992 | B1 * | 10/2020 | Tran | G06N 3/09 |
| 10,917,164 | B2 * | 2/2021 | Smyth | H04B 7/18517 |
| 10,917,925 | B2 * | 2/2021 | Taskin | H04W 88/16 |
| 10,942,251 | B2 * | 3/2021 | Kulkarni | G01S 5/04 |
| 10,979,103 | B2 * | 4/2021 | Jones | H04W 28/16 |
| 10,986,561 | B2 * | 4/2021 | Parikh | H04W 48/06 |
| 10,993,164 | B1 * | 4/2021 | Shukla | H04W 40/22 |
| 11,013,043 | B2 * | 5/2021 | Schmitz | H04W 40/24 |
| 11,032,819 | B2 * | 6/2021 | Gerszberg | H04B 7/022 |
| 11,102,560 | B2 * | 8/2021 | Hoole | H04W 36/08 |
| 11,109,244 | B2 * | 8/2021 | Rengarajan | H04W 24/02 |
| 11,115,813 | B1 * | 9/2021 | Parker | H04W 76/12 |
| 11,159,408 | B2 * | 10/2021 | Svennebring | H04L 41/147 |
| 11,171,960 | B2 * | 11/2021 | Levy | H04L 63/0227 |
| 11,178,662 | B2 * | 11/2021 | Chen | H04W 72/0453 |
| 11,206,549 | B1 * | 12/2021 | Eyuboglu | H04W 36/085 |
| 11,271,699 | B1 * | 3/2022 | Eyuboglu | H04J 11/0079 |
| 11,395,186 | B2 * | 7/2022 | Chennichetty | H04L 1/0004 |
| 11,445,356 | B2 * | 9/2022 | Abedini | H04W 8/08 |
| 11,553,412 | B2 * | 1/2023 | Padhiar | H04W 48/02 |
| 11,601,189 | B2 * | 3/2023 | Sampath | H04W 56/0015 |
| 11,646,492 | B2 * | 5/2023 | Tran | G06N 3/096 |
| | | | | 343/721 |
| 11,683,200 | B2 * | 6/2023 | Elliott | H04L 41/12 |
| | | | | 709/224 |
| 11,838,151 | B1 * | 12/2023 | Jones | H04L 25/0224 |
| 11,923,952 | B2 * | 3/2024 | Maltsev | H04B 7/15528 |
| 12,050,137 | B2 * | 7/2024 | Zinger | G06F 16/288 |
| 12,082,093 | B2 * | 9/2024 | Epstein | H04B 7/0691 |
| 12,353,203 | B2 * | 7/2025 | Cella | H04B 17/309 |
| 12,375,968 | B2 * | 7/2025 | Orhan | H04W 28/021 |
| 12,412,465 | B1 * | 9/2025 | Daoura | H04W 4/025 |
| 2014/0172864 | A1 * | 6/2014 | Shum | G16H 10/60 |
| | | | | 707/740 |
| 2016/0323815 | A1 * | 11/2016 | Kalika | H04W 40/248 |
| 2016/0345192 | A1 * | 11/2016 | Garg | H04L 12/2854 |
| 2017/0346729 | A1 * | 11/2017 | Pang | H04L 45/48 |
| 2018/0270875 | A1 * | 9/2018 | Hampel | H04W 88/04 |
| 2021/0168667 | A1 | 6/2021 | Byun et al. | |
| 2022/0377594 | A1 * | 11/2022 | Henriques De Jesus | H04W 28/0236 |
| 2023/0031945 | A1 * | 2/2023 | Wang | G01S 5/021 |
| 2025/0267705 | A1 * | 8/2025 | Kurita | H04W 74/002 |

OTHER PUBLICATIONS

Anonymous; "3rd Generation Partnership Project; Technical Specification Group Radio Access Network; Study on Integrated Access and Backhaul; (Release 15);" 3 GPP Standard, Technical Report; 2018; pp. 1-111; 3GPP TR 38.874, No. 1.0.0.

Mar. 17, 2023 Search Report issued in French Patent Application No. 2208773.

* cited by examiner

METHOD AND DEVICE FOR SELECTING A NODE IN A LOCAL AREA NETWORK

TECHNICAL FIELD

The present invention relates to a method and a device for reconfiguring a local area network comprising nodes allowing an extension of wireless communication coverage in order to increase the range of the local area network by coordinating a plurality of access points incorporated in the nodes.

PRIOR ART

In local area networks (LAN), systems for extending wireless communication coverage can be used in order to increase the range of these local area networks LAN by coordinating a plurality of distributed access points AP. These various access points AP are incorporated in communication nodes, hereinafter simply referred to as nodes, interconnected by means of a backhaul subnetwork and all making available one and the same wireless local area network WLAN.

The nodes of the backhaul subnetwork are connected to one another by means of a mesh structure in tree form, a node then being able to serve as relay between two other nodes of the backhaul subnetwork. The nodes of the backhaul subnetwork are thus interconnected by means of cable connections, for example of the Ethernet type, or wireless connections. The nodes of the backhaul subnetwork are connected together by a network that is also called a backhaul network, which may be either cable or wireless, or a combination of the two.

Each node of the backhaul subnetwork also sends at least one wireless network that is called fronthaul network, to which the stations of the user are connected. This fronthaul network, if it uses Wi-Fi/IEEE 802.11 technology, is the equivalent of what is called BSS (Basic Service Set).

At least one of the nodes of the backhaul subnetwork is connected to a residential gateway that provides access to the internet. The residential gateway may also form part of the backhaul subnetwork.

In the context of the nodes of the backhaul subnetwork, coupled or not to a residential gateway, the choice of the frequency band used for the backhaul network previously came down to the 2.4 GHz frequency band (limited in terms of rate, very congested) and the 5 GHz band enabling higher rates. In fact, the 5 GHz band was often favoured for the choice of the backhaul subnetwork. This backhaul subnetwork functionality is provided by a radio interface, dedicated or not.

Each radio of a node of the backhaul subnetwork has a client part (station) that is associated with an access point of another node of the backhaul subnetwork. This access point may be dedicated to the functionality of the backhaul subnetwork of be the same as the one dedicated to the fronthaul subnetwork.

At the present time the majority of solutions use only a single band for the backhaul subnetwork. This choice obviously forces the channel to be the same for all the radios of the items of equipment used for the function of the backhaul subnetwork.

Opening the 6 GHz band to Wi-Fi technologies henceforth makes it possible to have two frequency bands supporting high-rate transmissions (5 GHz and 6 GHz) and therefore candidates for the backhaul subnetwork function.

The topology in tree form introduces a latency in the transmission of the data and it is sometimes necessary to reconfigure the backhaul subnetwork. When the backhaul subnetwork is reconfigured, Wi-Fi connections between the nodes of the backhaul subnetwork are deleted and others are added. During the reconfiguration, the stations of the user of the fronthaul network that are connected to the nodes involved in the reconfiguration of the backhaul subnetwork may temporarily suffer losses of connections.

The present invention proposed makes it possible to guarantee that the stations that are connected to the nodes involved in the reconfiguration of the backhaul subnetwork do not suffer any connection loss.

DISCLOSURE OF THE INVENTION

For this purpose, according to a first aspect, one embodiment proposes a method for reconfiguring a first interconnection of a first node with a second node of a backhaul subnetwork in a local area network comprising a plurality of nodes allowing an extension of wireless communication coverage in order to increase the range of the local area network by coordinating a plurality of access points integrated in the nodes, the first and second nodes being interconnected by a radio connection in a first frequency band, characterised in that the method comprises the steps, performed by a so-called controller node, of:

selecting a third node of the local area network, the third node being different from the first and second nodes,
    establishing a second interconnection between the first and third nodes by a radio connection in a second frequency band different from the first frequency band,
    deleting the first interconnection when the second interconnection is established.

One embodiment also relates to a device for reconfiguring a first interconnection of a first node with a second node of a backhaul subnetwork in a local area network comprising a plurality of nodes allowing an extension of wireless communication coverage in order to increase the range of the local area network by coordinating a plurality of access points integrated in the nodes, the first and second nodes being interconnected by a radio connection in a first frequency band, characterised in that the device is included in a so-called controller node, and comprises:

means for selecting a third node of the local area network, the third node being different from the first and second nodes,
    means for establishing a second interconnection between the first and third nodes by a radio connection in a second frequency band different from the first frequency band,
    means for deleting the first interconnection when the second interconnection is established.

According to a particular embodiment, the nodes of the backhaul subnetwork are connected to one another by means of a mesh structure in tree form, the first node serving as relay between a node of a higher hierarchical level in the tree and a node of lower hierarchical level in the tree, and the third node is not a node of lower hierarchical level for which the first node serves as relay.

According to a particular embodiment, the nodes of the backhaul subnetwork are connected to one another by means of a mesh structure and the method further comprises the steps of:

checking whether establishing the second interconnection creates two pathways for transferring data between two nodes of the mesh network and, if so interrupting the transfer of data between the two nodes of the mesh network on one of the two pathways.

According to a particular embodiment, the method further comprises the steps of:

selecting a fourth node of the local area network, the fourth node being different from the second node, establishing, when the first interconnection is deleted, a third interconnection between the first and fourth nodes by a radio connection in the first frequency band, According to a particular embodiment, the method further comprises the step of deleting the second interconnection when the third interconnection is established.

According to a particular embodiment, the nodes of the backhaul subnetwork are connected to one another by means of a mesh structure in tree form, the third node serving as relay between at least one node of a higher hierarchical level in the tree and at least one node of lower hierarchical level in the tree, and the fourth node is not a node of lower hierarchical level for which the third node serves as relay.

According to a particular embodiment, the nodes of the backhaul subnetwork are connected to one another by means of a mesh structure and the method further comprises the steps of:

checking whether establishing the third interconnection creates two pathways for transferring data between two nodes of the mesh network and, if so interrupting the transfer of data between the two nodes of the mesh network on one of the two pathways.

A particular embodiment also relates to a computer program product. It comprises instructions for implementing, by an item of equipment, the method according to one of the above embodiments, when said program is executed by a processor of the equipment.

A particular embodiment also relates to a storage medium. It stores a computer program comprising instructions for implementing, by a node device, the method according to one of the above embodiments, when said program is executed by a processor of the node device.

BRIEF DESCRIPTION OF THE DRAWINGS

The features of the invention mentioned above, as well as others, will emerge more clearly from the reading of the following description of an example embodiment, said description being made in relation to the accompanying drawings, among which.

DETAILED DISCLOSURE OF EMBODIMENTS

Figure 1:
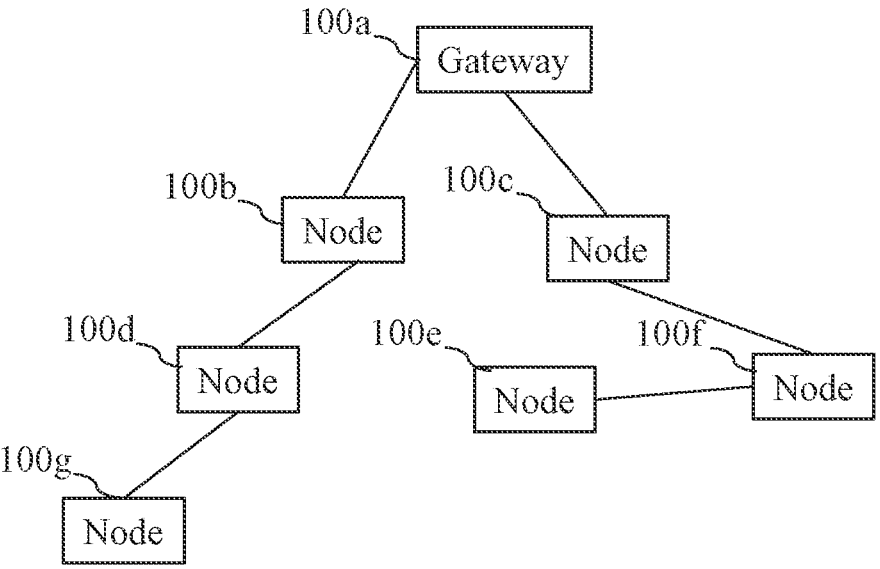
FIG. 1 illustrates schematically an example of a local area network in one embodiment.

FIG. 1 illustrates an example of a local area network in one embodiment;

The mesh local area network is constructed around a backhaul subnetwork comprising a set of interconnected nodes 100a to 100g.

The node 100a is for example a residential gateway that provides access to a wide area network, such as for example the internet.

The nodes 100b to 100g are systems for extending wireless communication coverage that are used in order to increase the range of the local area network by coordinating a plurality of distributed access points AP. These various access points AP are incorporated in the nodes that are interconnected by means of a backhaul subnetwork and all make available one and the same wireless local area network WLAN. In one example, some or all of the nodes 100b to 100g are wireless coverage extenders.

The node 100a may be included in the backhaul subnetwork.

The nodes 100a to 100g of the backhaul subnetwork are connected to one another by means of a mesh structure in tree form, a node then being able to serve as relay between two other nodes of the backhaul subnetwork. The nodes of the backhaul subnetwork are for example interconnected by means of wireless connections.

Each node of the backhaul subnetwork sends at least one wireless network that is called fronthaul network, to which the stations of the user are connected. This fronthaul network, if it uses Wi-Fi/IEEE 802.11 technology, is the equivalent of what is called BSS (Basic Service Set).

In the example in FIG. 1, the node 100a is connected to the nodes 100b and 100c, the node 100b is interconnected to the node 100d, the node 100d is connected to the node 100g, the node 100c is connected to the node 100f, the node 100f is connected to the node 100e.

At least some of the nodes 100a to 100g of the backhaul network comprise a plurality of radio interfaces.

The elements of a node are described in more detail with reference to FIG. 7.

Figure 7:
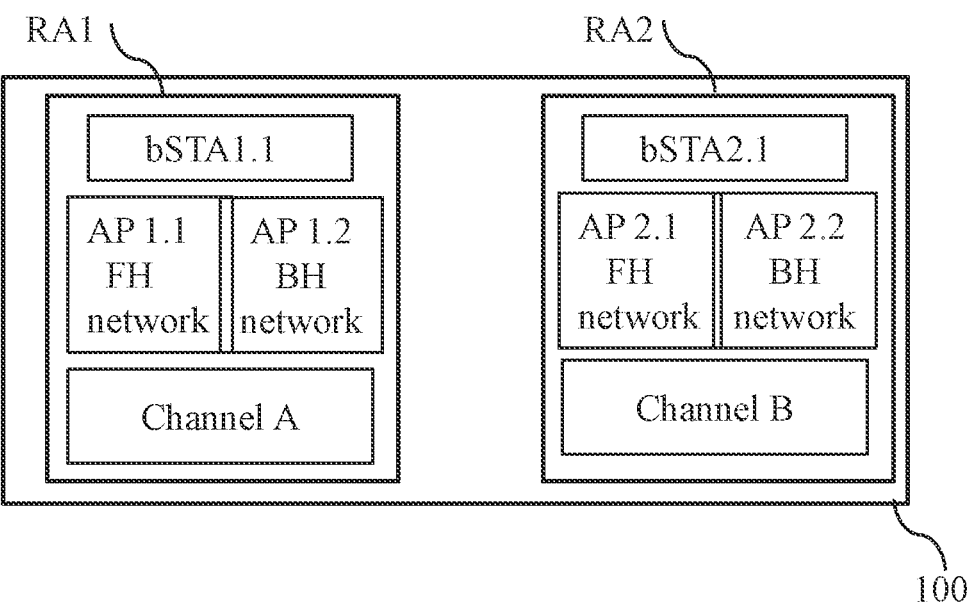
FIG. 7 illustrates schematically various elements of a node according to one embodiment.

FIG. 7 illustrates schematically various elements of a node 100 according to one embodiment.

At least some of the nodes 100a to 100g of the backhaul network comprise:

a radio interface RA1 operating on a first frequency band, for example the 5 GHz frequency band, a radio interface RA2 operating on a second frequency band, for example the 6 GHz frequency band.

The first radio interface RA1 comprises:

a client interface bSTA1.1 of the backhaul subnetwork, an access-point interface AP1.2 of the backhaul subnetwork, the access-point interface AP1.2 being dedicated to associating client interfaces of other nodes of the backhaul network, optionally an access-point interface AP1.1 corresponding to an access-point interface of the user local area network, this interface being dedicated to associating stations or terminals (fronthaul network), a radio channel denoted A for sending and receiving in the frequency band of the radio RA1.

The second radio interface RA2 comprises:

a client interface bSTA2.1 of the backhaul subnetwork, an access-point interface AP2.2 of the backhaul subnetwork, the access-point interface AP2.2 being dedicated to associating client interfaces of other nodes of the backhaul network, optionally an access-point interface AP2.1 corresponding to an access-point interface of the user local area network, this interface being dedicated to associating stations or terminals (fronthaul network), a radio channel denoted B for sending and receiving in the frequency band of the radio RA2.

It should be noted here that only two radio channels are shown for reasons of simplification. Naturally, the nodes may comprise a larger number of radio channels.

Hereinafter the term "node" should be understood to mean equipment offering connectivity capabilities and constituting the mesh local area network.

Hereinafter the term "station" should be understood to mean fixed or mobile equipment using the resources of the mesh local area network via nodes of said local area network. A station is for example a wireless mobile terminal or a wireless speaker.

In various examples, the equipment, nodes or stations are respectively each compatible with one or more standards in the IEEE 802.11 family of standards.

A radio may host a plurality of access-point interfaces, each access-point interface AP having its own connection parameters (e.g. an access-point interface for a private network, a public network, a video network, etc).

Each new node or station that seeks an access point with which to associate can, before association, select the optimum access point in the topology of the network. Each new node or station can also decide whether the propagation conditions (for example on the basis of an indicator of the received power ("Received Signal Strength Indicator (RSSI)") between the various possible access points are equivalent, and favour a radio interface not being used for the backhaul subnetwork.

The stations are for example smartphones or a tablet, a computer, a television, or a network attached storage (NAS) unit.

Figure 2:
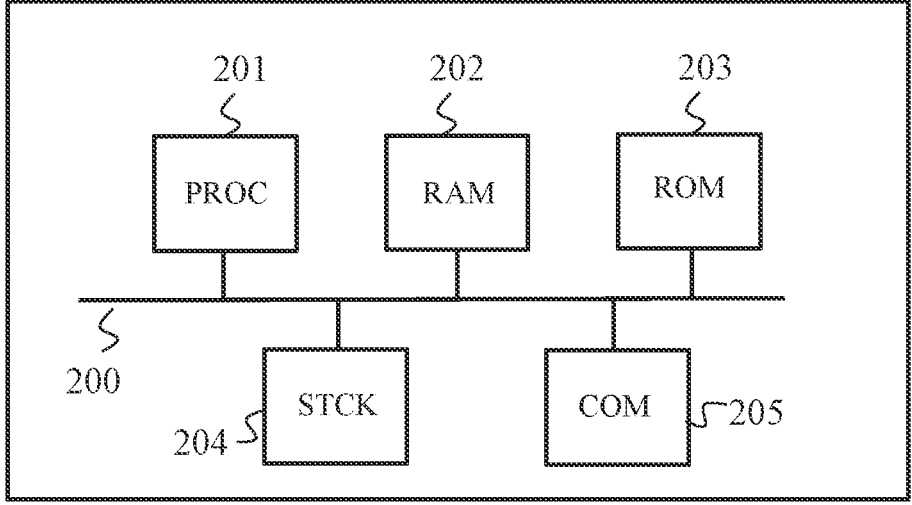
FIG. 2 illustrates schematically the architecture of a node according to embodiment.

FIG. 2 illustrates schematically the architecture of a node according to one embodiment. According to the example of hardware architecture shown in FIG. 2, at least the nodes 100b, 100d and 100e comprise, connected by a communication bus 200: a processor or CPU ("central processing unit") 201; a random access memory (RAM) 202; a read only memory (ROM) 203; a storage unit such as a hard disk (or a storage medium reader, such as an SD (Secure Digital) card reader) 204; at least one communication interface 205 enabling the node to communicate with the equipment of the local area network. The processor 201 is capable of executing instructions loaded in the RAM 202 from the ROM 203, from an external memory (not shown), from a storage medium (such as an SD card), or from a communication network. When the node is powered up, the processor 201 is capable of reading instructions from the RAM 202 and executing them. These instructions form a computer program causing the implementation, by the processor 201, of all or part of the method described in relation to FIG. 3.

The method described below in relation to FIGS. 3, can be implemented in software form by executing a set of instructions by a programmable machine, for example a DSP ("digital signal processor"), or a microcontroller, or be implemented in hardware form by a machine or a dedicated component, for example an FPGA (field-programmable gate array) or an ASIC (application-specific integrated circuit). In general, the node comprises electronic circuitry configured for implementing the methods described in relation to FIG. 3.

Figures 3A, 3B:
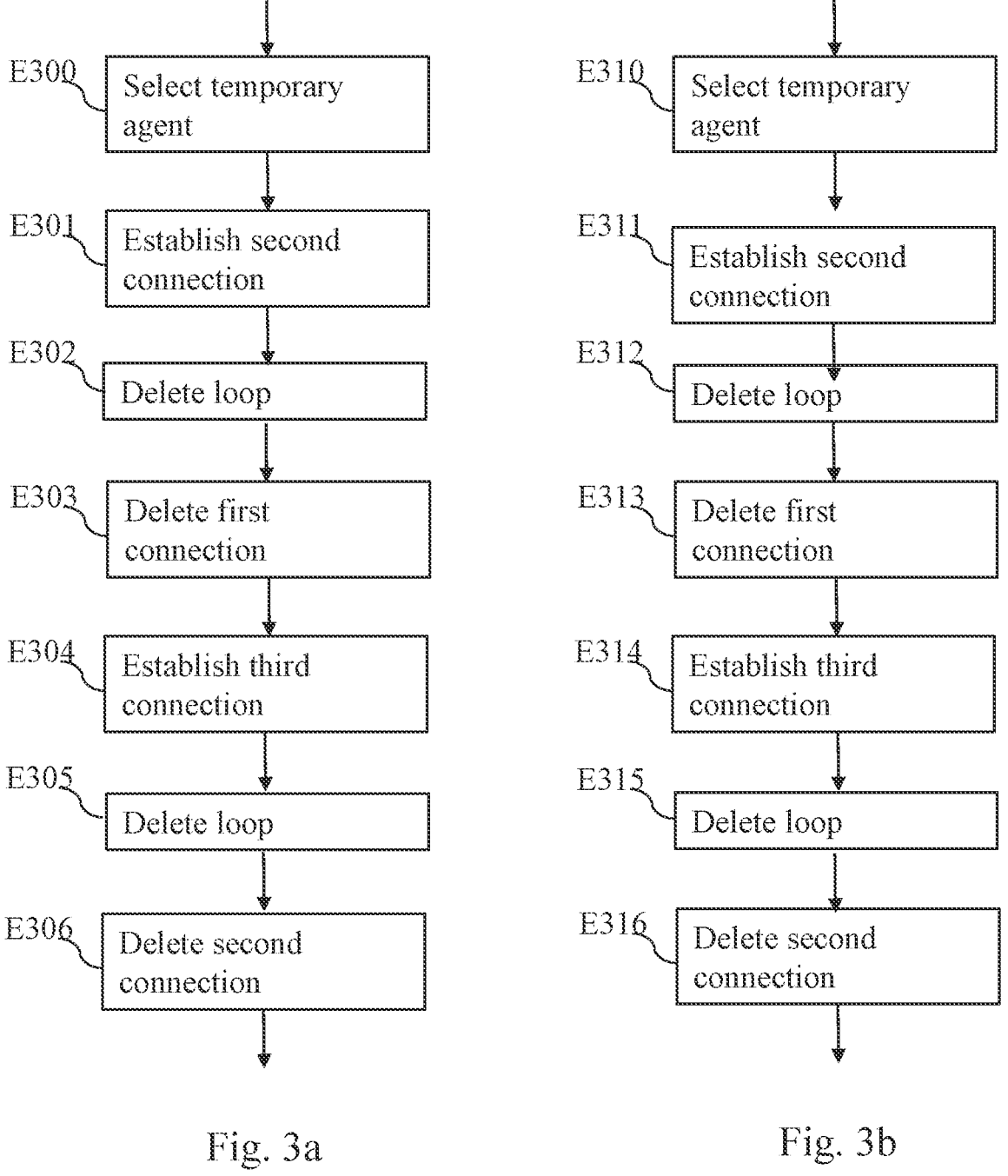
FIG. 3a illustrates an example of a method implemented according to a first embodiment.
FIG. 3b illustrates an example of a method implemented according to a second embodiment.

FIG. 3a illustrates an example of a method implemented according to a first embodiment; The present algorithm is executed by a node called controller of the backhaul subnetwork. The present algorithm is for example executed when a local area network must be reconfigured.

According to the first embodiment, the interconnection between a first node 100e and a second node 100f must be replaced by an interconnection between the first node 100e and a fourth node 100b temporarily using a third node 100d.

The controller is for example included in the node 100a.

At the step E300, the controller selects a temporary node, for example the node 100d.

The nodes of the backhaul subnetwork are connected to one another by means of a mesh structure in tree form, the first node serves as relay between nodes of a higher hierarchical level in the tree and nodes of lower hierarchical level in the tree, and the third and fourth nodes are different from the nodes of lower hierarchical level for which the first node serves as relay.

Figures 4A, 4B:
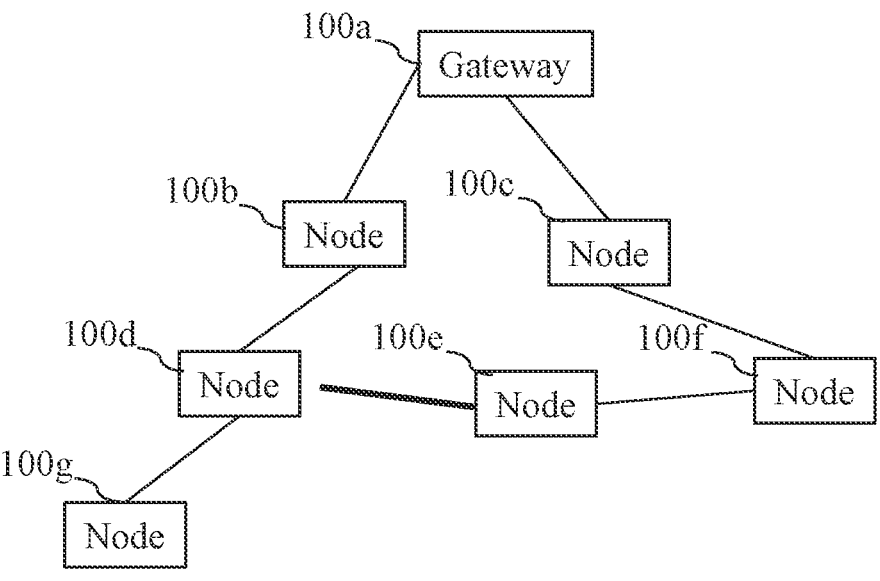
FIG. 4a, FIG. 4b, FIG. 4c and FIG. 4d illustrate an example of reconfiguration of a local area network comprising nodes allowing an extension of wireless communication coverage according to the first embodiment.

At the step E301, the controller demands the establishment of a second interconnection between the first and third nodes by a radio connection in a second frequency band different from the first frequency band, An example of establishing a second interconnection between the first and third nodes is given in FIG. 4a.

At the step E302, the controller checks whether establishing the second interconnection creates two pathways for transferring data between two nodes of the mesh network forming a loop and, if so, demands interruption at the logic level of the transfer of data between the two nodes of the mesh network on one of the two pathways. It should be noted here that neither of the two physical pathways is deleted.

At the step E 303, the controller demands the deletion of the first interconnection when the second interconnection is established. An example of the deletion of the first interconnection between the first and second nodes is given in FIG. 4b.

Figure 4C:
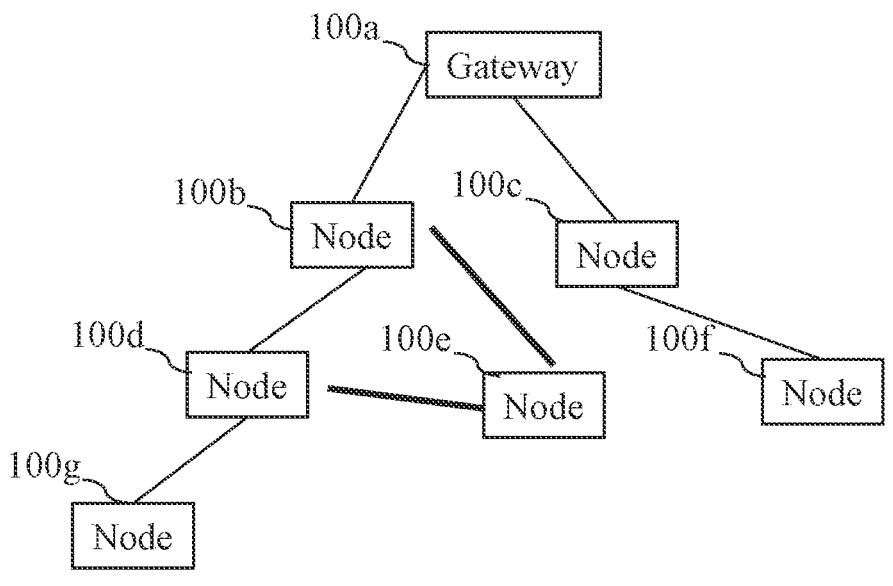
Figure 4D:
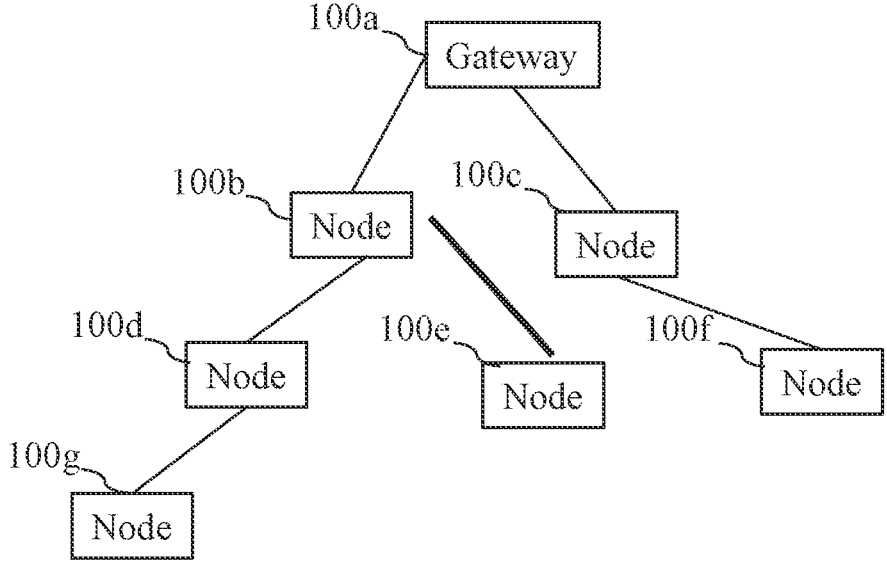

At the step E304, the controller demands the establishment, when the first interconnection is deleted, of a third interconnection between the first and fourth nodes by a radio connection in the first frequency band, An example of the establishment of a second interconnection between the first and third nodes is given in FIG. 4c.

At the step E305, the controller checks whether establishing the second interconnection creates two pathways for transferring data between two nodes of the mesh network and, if so, demands interruption of the transfer of data between the two nodes of the mesh network on one of the two pathways.

At the step E306, the controller demands the deletion of the first interconnection when the second interconnection is established. An example of the establishment of a second interconnection between the first and third nodes is given in FIG. 4c.

FIG. 3b illustrates an example of a method implemented according to a second embodiment.

The present algorithm is executed by a node called controller of the backhaul subnetwork.

The present algorithm is for example executed when a local area network must be reconfigured.

According to the second embodiment, the interconnection between the first node 100*e* and the second node 100*f* must be replaced by an interconnection between the first node 100*e* and a fourth node 100*b* temporarily using another radio channel of the fourth node. The fourth node is hereinafter referred to as third node 100*b*.

The controller is for example included in the node 100*a*.

At the step E310, the controller selects a temporary node, for example the third node 100*b*. The nodes of the backhaul subnetwork are connected to one another by means of a mesh structure in tree form, the first node serves as relay between nodes of a higher hierarchical level in the tree and nodes of lower hierarchical level in the tree, and the third and fourth nodes are different from the nodes of lower hierarchical level for which the first node serves as relay.

In a mesh network in tree form, a group or a branch of nodes can be defined when these nodes are connected by a wireless backhaul network and when one of the nodes in the group is connected to another group via an Ethernet backhaul network. In one and the same group of nodes, the wireless backhaul network uses the same channel for all the interconnections between the nodes in the group.

Figure 5A:
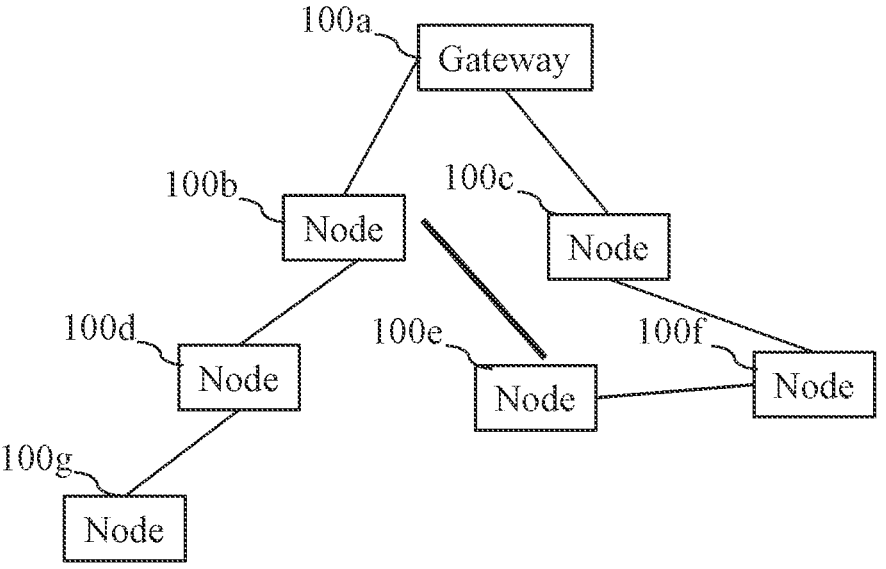
FIG. 5a, FIG. 5b, FIG. 5c and FIG. 5d illustrate an example of reconfiguration of a local area network comprising nodes allowing an extension of wireless communication coverage according to the second embodiment.

At the step E311, the controller demands the establishment of a second interconnection between the first and third nodes by a radio connection in a second frequency band different from the first frequency band. An example of the establishment of a second interconnection between the first and third nodes is given in FIG. 5*a*.

At the step E312, the controller checks whether establishing the second interconnection creates two pathways for transferring data between two nodes of the mesh network forming a loop and, if so, demands interruption at the logic level of the transfer of data between the two nodes of the mesh network on one of the two pathways. It should be noted here that neither of the two physical pathways is deleted.

Figure 5B:
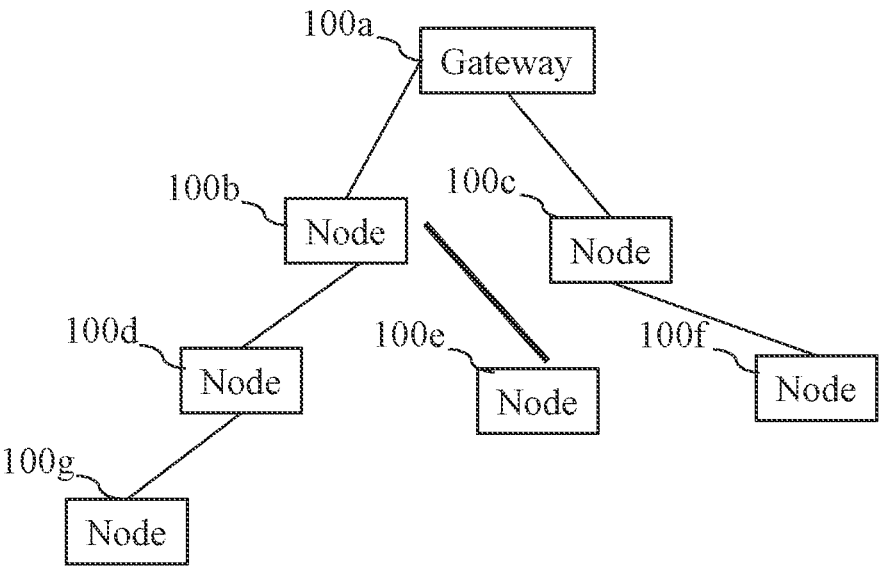

At the step E313, the controller demands the deletion of the first interconnection when the second interconnection is established. An example of the deletion of the first interconnection between the first and second nodes is given in FIG. 5*b*.

Figure 5C:
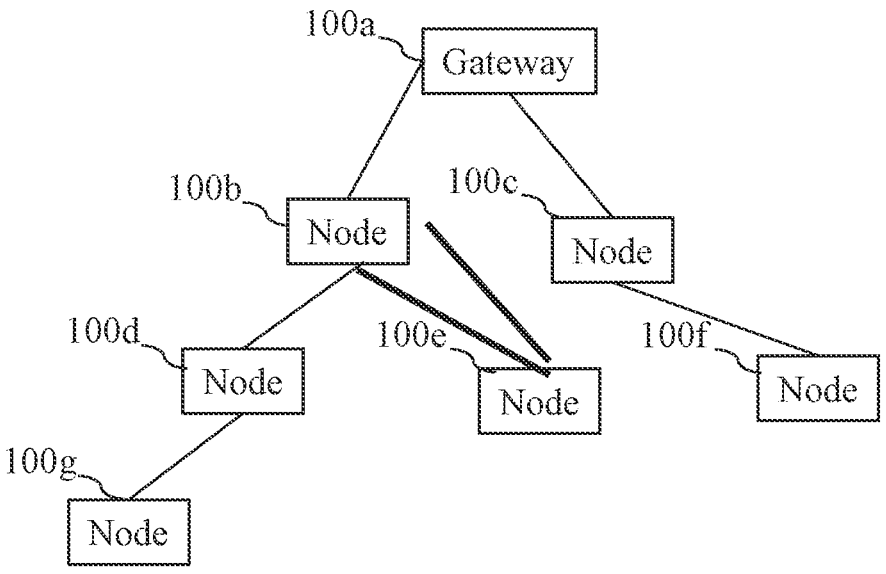
Figure 5D:
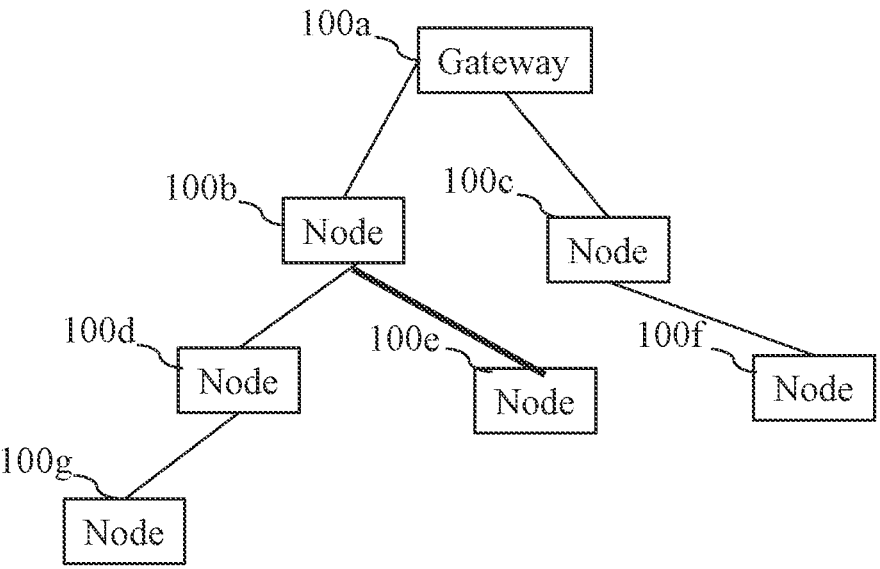

At the step E314, the controller demands the establishment, when the first interconnection is deleted, of a third interconnection between the first and fourth nodes by a radio connection in the first frequency band. An example of the establishment of a second interconnection between the first and third nodes is given in FIG. 5*c*.

At the step E315, the controller checks whether establishing the second interconnection creates two pathways for transferring data between two nodes of the mesh network forming a loop and, if so, demands the interruption of the transfer of data between the two nodes of the mesh network on one of the two pathways.

At the step E316, the controller demands the deletion of the second interconnection when the third interconnection is established. An example of the establishment of a second interconnection between the first and third nodes is given in FIG. 5*c*.

In a variant, step E316 is not performed.

It should be noted that, in a variant, the interconnection between the first node 100*e* and the fourth node 100*b* is made by temporarily using another radio channel of the first node. The first node is then called third node 100*b*.

Figure 3C:
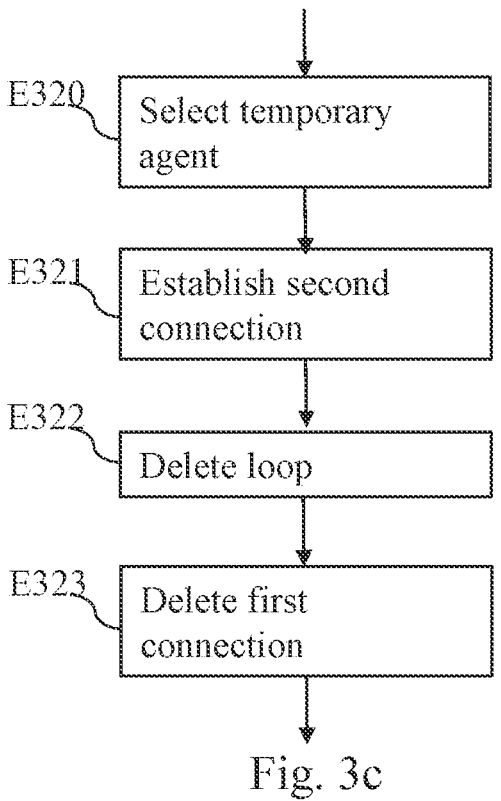
FIG. 3c illustrates an example of a method implemented according to a third embodiment.

FIG. 3*c* illustrates an example of a method implemented according to a third embodiment; The present algorithm is executed by a node called controller of the backhaul subnetwork. The present algorithm is for example executed when a local area network must be reconfigured.

According to the third embodiment, the interconnection between the first node 100*e* and the second node 100*f* must be replaced by an interconnection between the first node 100*e* and the fourth node 100*b*.

The controller is for example included in the node 100*a*.

At the step E320, the controller selects a temporary node, for example the third node 100*b*.

The nodes of the backhaul subnetwork are connected to one another by means of a mesh structure in tree form, if the first node serves as relay between nodes of a higher hierarchical level in the tree and nodes of lower hierarchical level in the tree, and the third node is different from the nodes of lower hierarchical level for which the first node serves as relay.

Figure 6A:
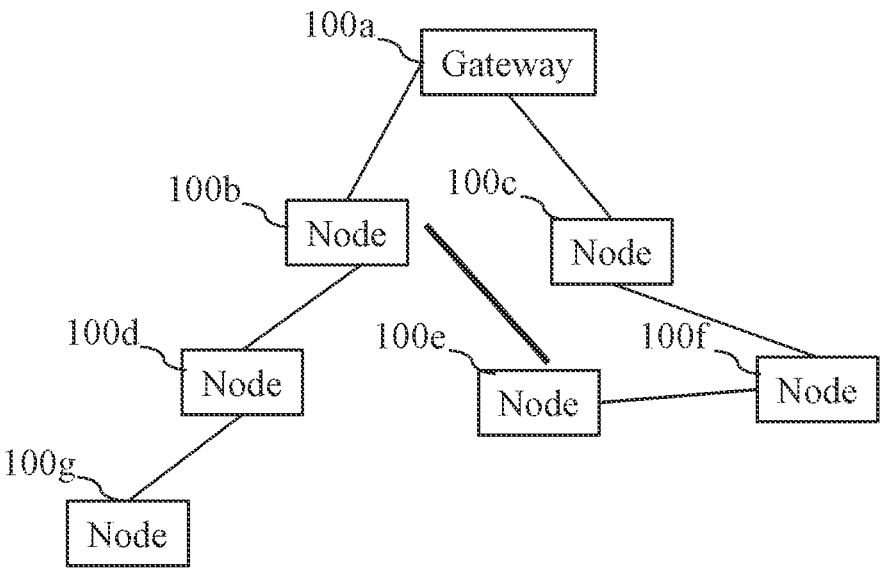
FIG. 6a and [FIG. 6b] illustrate an example of reconfiguration of a local area network comprising nodes allowing an extension of wireless communication coverage according to the third embodiment.

At the step E321, the controller demands the establishment of a second interconnection between the first and third nodes by a radio connection in a second frequency band different from the first frequency band. An example of the establishment of a second interconnection between the first and third nodes is given in FIG. 6*a*.

At the step E322, the controller checks whether establishing the second interconnection creates two pathways for transferring data between two nodes of the mesh network forming a loop and, if so, demands the interruption at the logic level of the transfer of data between the two nodes of the mesh network on one of the two pathways. It should be noted here that neither of the two physical pathways is deleted.

Figure 6B:
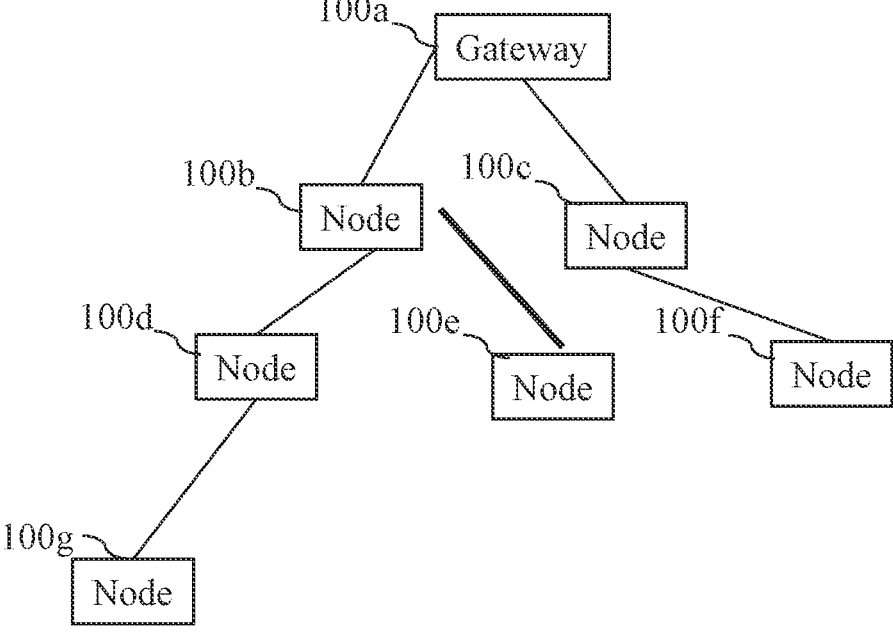

At the step E323, the controller demands the deletion of the first interconnection when the second interconnection is established. An example of the deletion of the first interconnection between the first and second nodes is given in FIG. 6*b*.

In other embodiments, the controller of the backhaul subnetwork is included in one of the nodes of the mesh structure in tree form. For example, when the interconnection between the node 100*e* and the node 100*f* is reconfigured as an interconnection between the node 100*e* and the node 100*b*, the controller can be included in said node 100*b* or the node 100*c*. In other embodiments, the controller of the backhaul subnetwork is a function offered by equipment external to the mesh structure. For example, this external equipment cooperates with the node 100*a* connected to the wide area network in order to make it possible to reconfigure the interconnections between the nodes.

The invention claimed is:

1. A method for reconfiguring a first interconnection of a first node with a second node of a backhaul subnetwork in a local area network comprising a plurality of nodes allowing an extension of wireless communication coverage in order to increase the range of the local area network by coordinating a plurality of access points integrated in the nodes, the first and second nodes being interconnected by a radio connection in a first frequency band, characterised in that the method comprises the steps, performed by a controller node, of:

selecting a third node of the local area network, the third node being different from the first and second nodes, the nodes of the backhaul subnetwork are connected to one another by means of a mesh structure in tree form, the first node serving as relay between at least one node of higher hierarchical level in the tree and at least one node of lower hierarchical level in the tree, and the third node is not a node of lower hierarchical level for which the first node serves as relay, establishing a second interconnection between the first and third nodes by a radio connection in a second frequency band different from the first frequency band, deleting the first interconnection when the second interconnection is established, and following the establishment of the second interconnection:

checking whether establishing the second interconnection creates two pathways for transferring data between two nodes of the backhaul subnetwork and, if so interrupting the transfer of data at a logic level on one of the two pathways while maintaining the physical pathway of the second interconnection.

2. The method according to claim 1, wherein the method further comprises the steps of:

selecting a fourth node of the local area network, the fourth node being different from the second node, establishing, when the first interconnection is deleted, a third interconnection between the first and fourth nodes by a radio connection in the first frequency band.

3. The method according to claim 2, wherein the method further comprises the step of deleting the second interconnection when the third interconnection is established.

4. The method according to claim 2, wherein the nodes of the backhaul subnetwork are connected to one another by means of a mesh structure in tree form, the third node serving as relay between at least one node of a higher hierarchical level in the tree and at least one node of lower hierarchical level in the tree, and the fourth node is not a node of lower hierarchical level for which the third node serves as relay.

5. The method according to claim 1, wherein the nodes of the backhaul subnetwork are connected to one another by means of a mesh structure and the method further comprises the steps of:

checking whether establishing the third interconnection creates two pathways for transferring data between two nodes of the mesh network and, if so interrupting the transfer of data between the two nodes of the mesh network on one of the two pathways.

6. A device for reconfiguring a first interconnection of a first node with a second node of a backhaul subnetwork in a local area network comprising a plurality of nodes allowing an extension of wireless communication coverage in order to increase the range of the local area network by coordinating a plurality of access points integrated in the nodes, the first and second nodes being interconnected by a radio connection in a first frequency band, wherein the device is included in a controller node that comprises electronic circuitry configured for:

selecting a third node of the local area network, the third node being different from the first and second nodes, the nodes of the backhaul subnetwork are connected to one another by means of a mesh structure in tree form, the first node serving as relay between at least one node of higher hierarchical level in the tree and at least one node of lower hierarchical level in the tree, and the third node is not a node of lower hierarchical level for which the first node serves as relay, establishing a second interconnection between the first and third nodes by a radio connection in a second frequency band different from the first frequency band, deleting the first interconnection when the second interconnection is established, and following the establishment of the second interconnection:

checking whether establishing the second interconnection creates two pathways for transferring data between two nodes of the backhaul subnetwork and, if so interrupting the transfer of data at a logic level on one of the two pathways while maintaining the physical pathway of the second interconnection.

7. A non-transitory computer readable medium embodying a computer program product that stores a computer program comprising instructions for implementing, by an item of equipment, the method according to claim 1, when the program is executed by a processor of the equipment.

* * * * *